June 1, 1971 D. S. RODBELL 3,581,390
METHOD OF FORMING SINGLE TURN MAGNETIC RECORDING HEADS
Filed Feb. 10, 1969 2 Sheets-Sheet 1

INVENTOR:
DONALD S. RODBELL,
by John J. Kissane
HIS ATTORNEY

METHOD OF FORMING SINGLE TURN MAGNETIC RECORDING HEADS

Filed Feb. 10, 1969

INVENTOR:
DONALD S. RODBELL,
by John J. Kissane
HIS ATTORNEY

United States Patent Office 3,581,390
Patented June 1, 1971

3,581,390
METHOD OF FORMING SINGLE TURN MAGNETIC RECORDING HEADS

Donald S. Rodbell, Tokyo, Japan, assignor to General Electric Company

Filed Feb. 10, 1969, Ser. No. 797,887
Int. Cl. H01f 7/06
U.S. Cl. 29—603 7 Claims

ABSTRACT OF THE DISCLOSURE

A simplified method of forming a single turn read/write magnetic recording head is described wherein at least a portion of a magnetic sheathed conductor is compressed, e.g. by drawing and cold rolling a nickel-iron-cobalt coated copper wire, to form a laminar ribbon having a center conductor equal in thickness to the desired recording head gap. After mounting the laminar ribbon upon a suitable heat sink, the ribbon is dissected along a plane perpendicular to the plane of the ribbon to expose the recording surface of the head. When only a central section of a bifurcated shaped magnetic coated conductor is compressed to a laminar ribbon and dissected, a single turn recording head having inherently attached heads is formed. For simultaneous recording on adjacent tracks with a minimum of crosstalk, a multihead structure is formed by bonding conductive leads along opposite faces of a unitary homogeneous compressed laminar ribbon prior to dissection of the ribbon to expose the recording surfaces.

Figure 1:
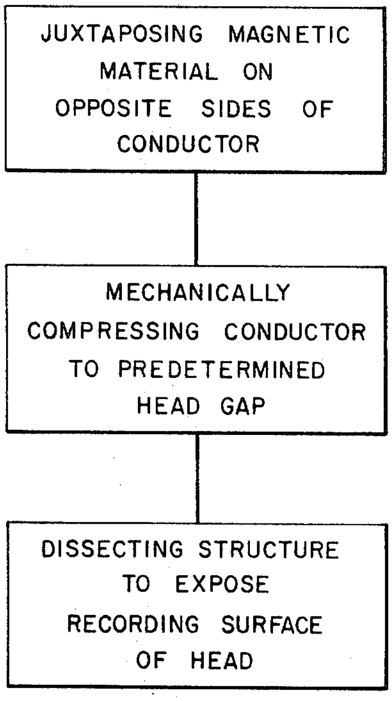

This invention relates to a method of forming single turn read-write magnetic recording heads and in particular to a simplified method of forming recording heads by compressing an electrical conductor sheathed with magnetic material to a predetermined dimension and dissecting the compressed structure to form a head having an accuately dimensioned gap therein.

Narrow gap recording heads generally are desirable for high density recording and a plurality of techniques have been proposed to form recording heads of a desirable configuration. For example it has heretofore been proposed that high density magnetic recording heads be formed by vacuum evaporation of magnetic films on opposite faces of a fine strip conductor previously deposited to a thickness equal to the desired magnetic head gap. This technique however requires sophisticated evaporation equipment for precision control of the film thicknesses and batch processing of magnetic heads is severely restricted by spatial limitations inherent in the vacuum evaporation procedure.

Narrow gap recording heads also have been constructed mechanically by positioning a nonmagnetic shim intermediate confronting faces of a longitudinally slotted magnetic tube and compressing the tube upon the shim. The shim is of a thickness equal to the desired head gap width and compression of the magnetic tube generally is terminated upon simultaneous contact of both slot edges with the shim. Because the compression of the slotted tube alters the attitude of the slot faces relative to the shim, extreme care is required both in forming the slot faces and controlling the arcuate compression of the tube to assure complete contact of the slot faces with the shim.

It is therefore an object of this invention to provide a simplified mechanical method of forming single turn recording heads.

It is also an object of this invention to provide a method of forming single turn recording heads having contact leads inherently attached thereto.

It is a further object of this invention to provide a simplified method of simultaneously forming low crosstalk multiple recording heads.

It is a still further object of this invention to provide a method of mechanically forming a high density read-write magnetic recording head within a high tolerance.

These and other objects of this invention generally are achieved by juxtaposing a magnetic material on opposite sides of an electrical conductor and compressing the juxtaposed magnetic material and electrical conductor to reduce the thickness of the conductor to a predetermined head gap width. The compressed structure then is dissected along a plane perpendicular to the plane of the compressed structure to expose the recording surface of the head. When only the central portion of a bifurcated shaped wire conductor sheathed with a magnetic material is compressed and dissected to produce the single turn recording head, the uncompressed extremities of the wire conductor can be employed as inherently attached recording head leads.

The technique of this invention also is suitable for fabricating a plurality of single turn recording heads for the simultaneous writing and/or read-out of information along diverse tracks of a magnetic storage medium. In forming such a multihead structure, an elongated electrical conductor sheathed in a magnetic material is compressed to a laminar ribbon having a central conductor in a thickness equal to the predetermined gap width of the recording heads. A plurality of leads then are joined to the compressed ribbon at spans equal to the desired recording channel width with alternate leads preferably being disposed on opposite faces of the ribbon. After suitably mounting the ribbon upon a mechanical support, the ribbon is dissected along a plane perpendicular to the plane of the ribbon to expose the recording surfaces of the heads.

Figure 2:
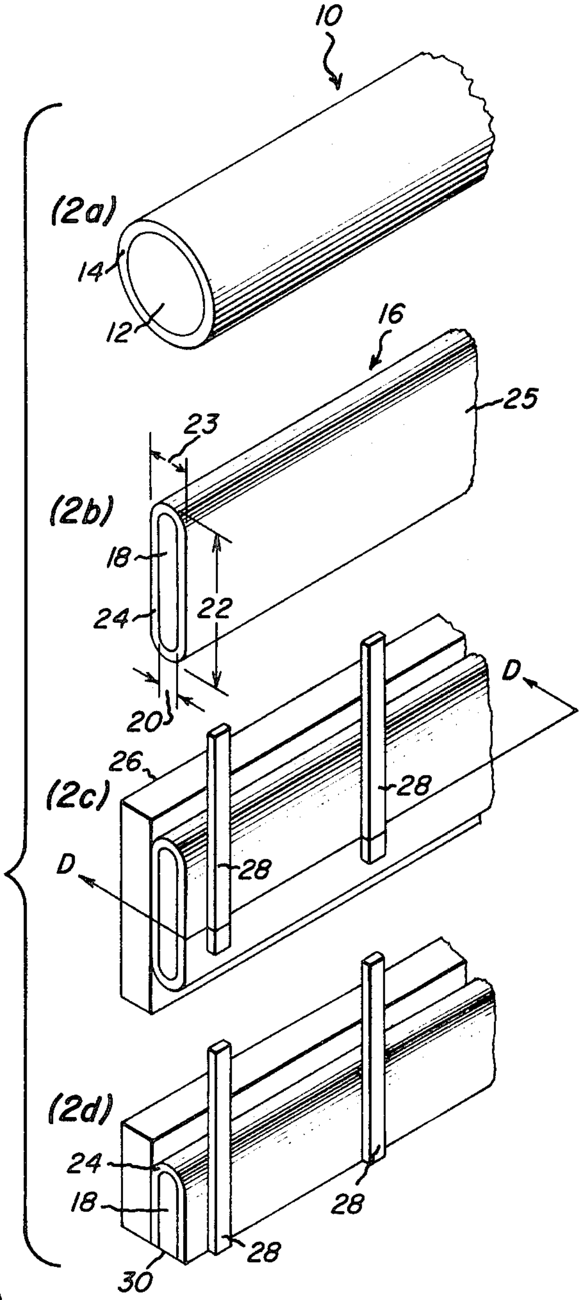
Figure 3:
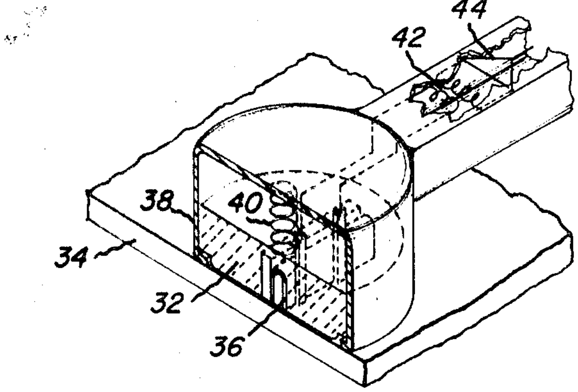
Figures 4, 5, 6:
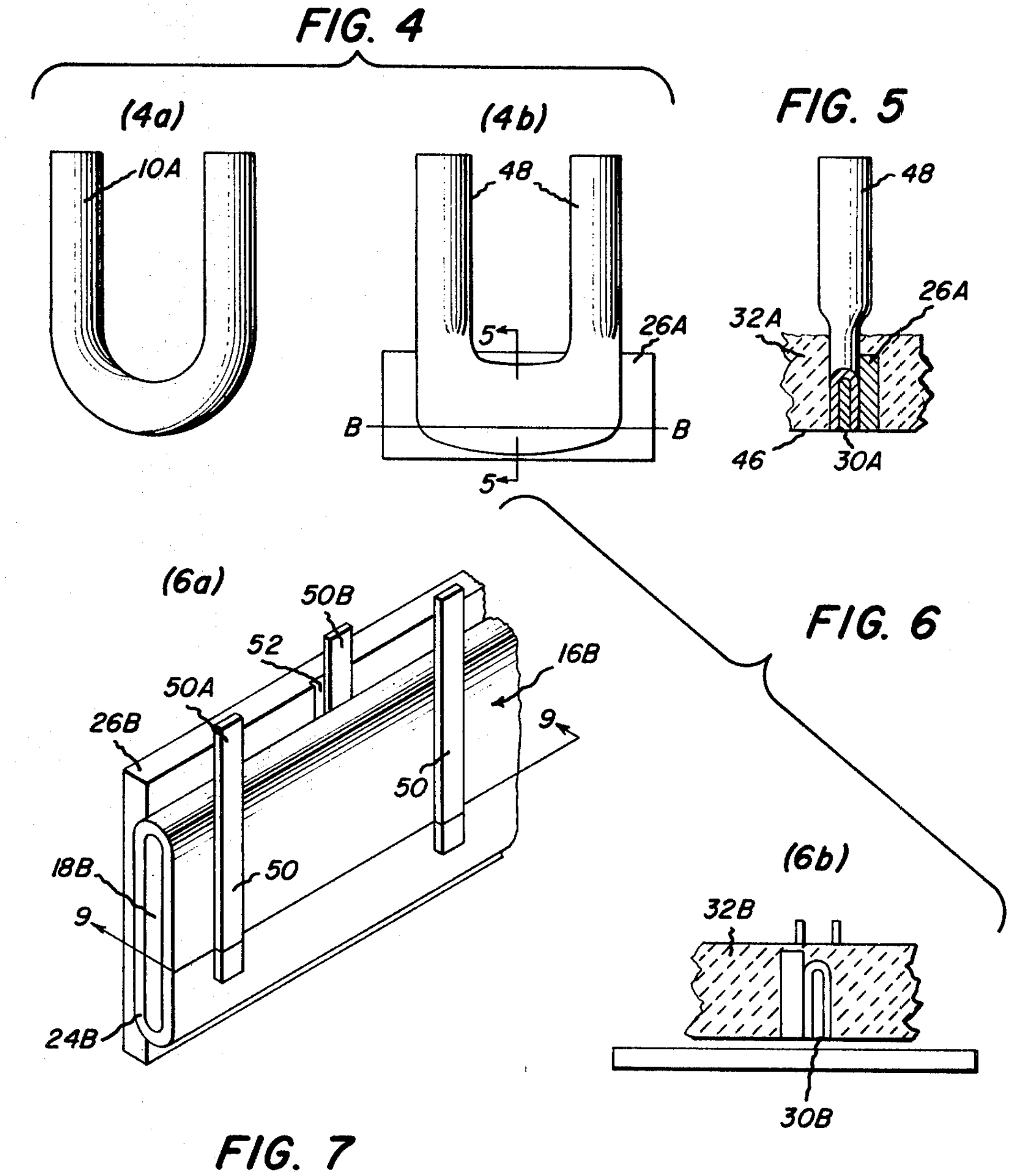
Figure 7:
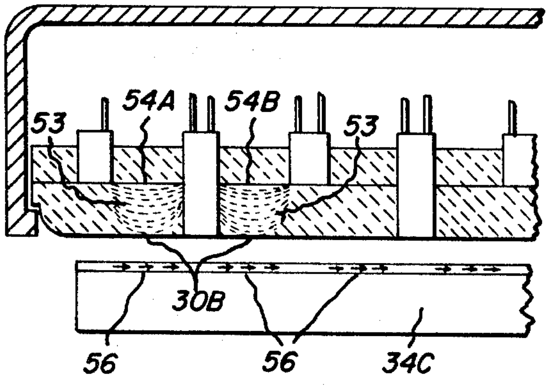

The novel features believed characteristic of the invention are set forth in the appended claims. The invention itself, together with further objects and advantages thereof may best be understood by reference to the following description, taken in connection with the accompanying drawings, in which:

FIG. 1 is a flow chart illustrating in block diagram form the method of this invention, FIG. 2 is a pictorial illustration of a preferred technique for forming the recording head of this invention, FIG. 3 is an exposed isometric view illustrating a suitabel mounting of the recording head of FIG. 2 for recording purposes, FIG. 4 is a pictorial illustration of a technique for forming a single turn recording head with inherently attached leads, FIG. 5 is a sectional view taken along line 5—5 of FIG. 4B, FIG. 6 is a pictorial illustration of the formation of mulitple single turn recording heads in accordance with this invention, and FIG. 7 is sectional views illustrating the employment of the multiple head for recording purposes.

The method of forming a single turn read/write head for magnetic recording in accordance with this invention is depicted in the block diagram of FIG. 1 and generally comprises juxtaposing a ductile magnetic material on opposite sides of nonmagnetic, ductile electrical conductor, compressing the juxtaposed materials by any mechanical film forming technique, e.g. rolling or forging, to reduce the thickness of the center conductor to a predetermined head gap width and subsequently dissecting the compressed structure along a plane perpendicular to the plane of the compressed structure to expose the recording surface of the head.

A specific illustration of the employment of the technique of this invention in forming a particular recording head is illustrated in FIG. 2 wherein the juxtaposed electrical conductor and magnetic material initially have the configuration of sheathed cable 10 having a central conductor 12 overlayed wtih a magnetic coating 14, as is depicted in FIG. 2A. Magnetic coating 14 generally can be any magnetic material such as iron, nickel, cobalt or alloys of these metals while central conductor 12 is any ductile nonmagnetic conductor such as copper, silver, lead, tin, gold, etc. with copper generally being preferred because of its high conductivity, good ductility and low cost. The chosen magnetic material and electrical conductor desirably are compatible with each other to form a good electrical and mechanical bond therebetween under high applied pressures. Thus, the inability of conductors such as aluminum to form a good compression bond with a juxtaposed magnetic metal such as iron generally negates the simultaneous employment of these two materials to form magnetic head in accordance with this invention. Although the method of forming sheathed cable 10 is not critical, e.g. cable 10 can be formed by the conventional electrodeposition of a magnetic film upon a conductive wire substrate, one relatively simple technique for forming such a structure is the filling of commercially available tubes of nickel-iron-cobalt alloy with a solid high purity coper wire having a diameter approximately equal to the inside diameter of the magnetic tube. The copper filled magnetic alloy tube is heat treated at 950° C. in an inert gaseous, e.g. argon, atmosphere for approximately 15 minutes and drawn through one or more stages of suitable dies to reduce the diameter of the magnetic sheathed cable to less than approximately 10-fold the desired gap for the recording head. During each stage of the drawing process, the wire is given a conventional heat treatment at 950° C. in an inert gaseous atmosphere to reduce strains induced in the cable by the drawing process. Preferably the tolerance between central conductor 12 and magnetic coating 14 permits a mutual bonding of the cable component layers e.g. conductor 12 and magnetic coating 14, during the initial mechanical reduction in cable diameter to inhibit creeping and a resultant ragged cross section between the conductor and the overlying magnetic coating.

After drawing sheathed cable 10 to a narrow guage outside diameter, the cable is compressed preferably by cold rolling, i.e., rolling stock at temperatures below 600° C., to flatten the cylindrical cable to an oval ribbon 16, depicted in FIG. 2B, having an inner conductor 18 with a minor axis 20 approximately equal to the desired recording head gap. Other film forming techniques, such as hot rolling or forging, also can be employed to flatten cable 10 dependent upon the ductility of the materials forming the layers of cable 10 and the acceptable tolerance in gap dimension across the length of the recording head. Because cold rolling is the most precise of the swagging techniques and produces a ribbon having a minimum tendency to curl, it generally is preferred in the practice of this invention. After cold rolling cable 10 to a ribbon, the ribbon again is annealed at 950° C. in the inert gaseous atmosphere to reduce any strain in the ribbon during rolling.

Although the physical configuration of ribbon 16 is determined primarily by the amount of rolling required to reduce inner conductor 12 to the desired head gap, the diameter of cable 10 at the initiation of the cold rolling should assure a rolled oval ribbon having a major axis 22 at least five fold the dimension of minor axis 23. The major faces 25 of ribbon 16 thus exhibit a minimum arcuate curvature (approaching a linear configuration) at the center of the ribbon to permit boding of a major portion of the ribbon faces to flat surfaces. Because a continuous magnetic sheathing 24 is required for ribbon 16, the relative thicknesses of central conductor 12 and magnetic coating 14 should be chosen relative to the ductility of the materials to assure a flattening of conductor 12 to a desired thickness without the creation if discontinuities interrupting flux linkages in magnetic sheathing 24.

After rolling cable 10 to ribbon 16, a convenient length of ribbon is bonded to dielectric substrate 26, e.g. employing an epoxy cement for securing a nickel-iron-cobalt alloy to an alumina or beryllia substrate, to provide mechanical support for the ribbon, as shown in FIG. 2C. Because polycrystalline beryllia is characterized by a high thermal conductivity of approximately 125 B.tu./(hr.) (sq. ft.) (° F./ft.) at 100° F., beryllia substrates also function as heat sinks for recording heads mounted thereon. Desirably, dielectric substrate 26 should exhibit a thermal conductivity in excess of approximately 30 B.t.u./(hr.) (sq. ft.) (° F./ft.) at 100° F. to assist in the removal of heat from recording heads employed in heavy duty operation.

Subsequent to the bonding of ribbon 16 to substrate 26, conductive leads 28 are affixed by a suitable technique such as soldering along the length of the ribbon face remote from the substrate in a direction parallel to major axis 22 of the oval ribbon. Thermo-compression bonding during the last stage of the ribbon rolling process also can be employed and is particularly advantageous in permitting rolling and affixing of the leads in a simultaneous operation. Desirably, leads 28 are secured to the ribbon over a major portion of the ribbon face to assure a good electrical contact to the ribbon and to produce a superior current distribution along the recording surface of the finished recording head (as will be more fully explained hereinafter).

After securing leads 28 to ribbon 16, the ribbon is dissected along a plane perpendicular to the plane of the ribbon, e.g. along line D—D of FIG. 2C, to expose the recording surface 30 of the single turn head depicted in FIG. 2D. Desirably the exposure of recording surface 30 also should effect a cutting of the lower extremities of leads 28 to assure that the contacting leads extend to the lower surface of the recording head. The single turn head thus formed is characterized by an inner conductor 18 rolled to the predetermined dimension for the recording head gap and overlayed with a magnetic sheathing 24 on all faces except recording surface 30. In general, the thickness of conductor 18 at recording surface 30 is less than 0.5 mil and customarily is in the order of 0.1–0.2 mil while magnetic sheathing 24 generally is less than approximately one-half the thickness of conductor 18 at recording surface 30.

While the dissection of ribbon 16 may be accomplished as shown in FIG. 2, the flattened ribbon having leads 28 and substrate 26 attached thereto preferably is partially mounted within a dielectric pad 32 at an attitude such that the lower extremity of the ribbon, e.g. the portion of the ribbon below line D—D of FIG. 2C, extends beyond the aerodynamic surface of the pad. The lower face of pad 32 then is machined to produce an aerodynamically stable surface for the pad while simultaneously removing the lower extremity of ribbon 16. The machined pad then is mounted in an overlying attitude relative to a magnetic storage medium, e.g. disk 34 shown in FIG. 3, with the central axis of ribbon 16 and the fore-aft aerodynamic direction of pad 32 extending in a radial and tangential direction, respectively, relative to the rotary motion of disk 34. The dissected ribbon forming recording head 36 preferably is positioned at the aerodynamic center of the pad and the entire pad is mounted within a suitable housing 38 containing a spring 40 biasing the recording head toward the underlying disk. Leads 28 from the recording head protrude from the pad surface remote from disk 34 and are connected in conventional fashion to suitable electronic amplification equipment, e.g. a cascaded ferrite transformer 42 and a high gain amplifier 44. During reading and writing of information, the speed of disk 34 is set in conventional manner relative to the aerodynamic surface of pad 32 to produce a buoying force upon the pad resulting in a recording head elevation approximately equal to the head gap.

A recording head having inherently attached leads can be formed in accordance with this invention by the simplified rolling and dissecting technique illutrated in FIG. 4. In forming such a head, small diameter sheathed cable 10A formed by the techniques described with reference to FIG. 2 is axially canted at an approximately central location along the length of the cable to form the bifurcated structure illustrated in FIG. 4A. The central curved portion of the cable then is cold rolled and annealed to flatten the center section of the cable (as shown in FIG. 4B) from a cylindrical cable having an outside diameter, for example, of approximately 0.003 inch to a ribbon having central conductor of a dimension desired for the recording head gap, e.g. 0.0003 inch. After rolling, the flattened portion of the cable is bonded to a dielectric substrate 26A having a high thermal transfer characteristic and the bonded structure is mounted within a suitable pad 32A having a lower face 46 which face is machined to an aerodynamic curvature, e.g. along lines B—B of FIG. 4B, thereby exposing recording surface 30A of the unitary structure head illustrated in FIG. 5. The cylindrical ends 48 of the centrally flattened cable protrude from the face of the pad remote from recording surface 30A to provide conventional wire contact leads for the recording head.

The wire compression technique of this invention also can be employed in the fabrication of multiple low cross-talk, single turn recording head structures along the length of a homogeneously configured ribbon. In forming the multihead structure, a sheathed cable, e.g. a copper filled magnetic tube, is drawn and flattened, e.g. by the techniques described with reference to FIG. 2, to an oval ribbon 16B illustrated in FIG. 6, having an inner conductor 18B less than approximately 0.5 mil in thickness overlayed with a magnetic sheathing 24B. After flattening ribbon 16B, a plurality of contact leads preferably in the shape of flat copper leads 50 are soldered along the length of the ribbon at intervals equal to the desired recording track width. For maximum density recording, a narrow recording track of, for example, 0.005 inch is desirable and the adjacent edges of the leads forming an individual head are separated by the chosen track span. Desirable leads 50 are bonded to the ribbon along a major portion of the ribbon face, e.g. over 40% of the ribbon height, and adjacent leads contacting a common recording head, e.g. leads 50A and 50B, preferably are positioned on opposite faces of the ribbon to maximize current flow through inner conductor 18B of the recording head. The ribbon with leads attached thereto then is mechanically bonded to a dielectric substrate 26B having notches 52 therein in registration with the leads and the structure is inserted within a pad 32B which is machined, e.g. along lines 9—9 of FIG. 6A, to expose the recording surface 30B of the head as shown in FIG. 6B.

Because adjacent copper leads forming the individual recording heads are bonded to magnetic sheathing 24C over a major portion of the recording head height, e.g. from approximately the zenith of inner conductor 18B to the disected exposed recording surface 30B, current flow in the individual leads is transferred ribbon 16C in a generally parabolic fashion as shown by dashed lines 53 of FIG. 7. Thus the current distribution at recording surface 30B of each individual recording head is maximized at the center of of each head and tapers upwardly from the recording surface at locations proximate the head leads. The current distribution produced by the elongated bond between the leads and flattened ribbon minimizes cross talk between adjacent heads, e.g. between heads 54A and 54B, and a band guard between heads is effected by the inherent current distribution thereby negating any requirement for a physical discontinuity, such as a slot, between adjacent heads. The inherent band guard between heads is further strengthened by the fact that the adjacent recording tracks 56 in disk 34C produced by current flow through adjacent heads 54A and 54B are spaced apart by the width of flat conductor leads 50. To assure isolation between recording tracks, leads 50 desirably are of a width in excess of 0.01 inches.

In one specific instance, a multihead structure was formed by filling a nickel-iron-cobalt alloy cylindrical tube with copper to produce a .033 inch O.D. sheathed cable having a .022 *inch* diameter copper core The cable then was heat treated in argon at 950° C. for 15 minutes whereupon the cable was drawn to an outside diameter of approximately 0.003 inch and cold rolled to produce an oval ribbon characterized by a 0.0003 inch thick copper conductor sheathed by a 0.0001 inch magnetic alloy at the minor axis of the oval ribbon. The ribbon was further characterized by a total height (or major axis) of approximately .0063 inches. After rolling of the ribbon to the desired dimension for a desired 0.0003 inch head gap, 0.02 inch by 0.001 inch contact leads were bonded to the major faces of the oval ribbon at a parallel attitude relative to the major axis of the oval and at a span of approximately 0.5 inch between centers of adjacent contact leads with every alternate contact lead being disposed on opposite faces of the ribbon. The ribbon then was mounted on an alumina substrate and partially embedded in an alumina pad which pad was machined to remove approximately 25% of the ribbon height to expose the 0.0003 inch thick inner copper conductor. When the structure thus produced was mounted approximately 2.5 microns above a 100 oersted recording medium, a 250 millivolt peak to peak signal was obtained from the individual recording heads employing an external amplification factor of 1500 produced by a ferrite transformer having an amplification factor of 15 cascaded with an electronic amplifier having an amplification factor of 100. No measurable cross talk was obtained between the adjacent heads of the ribbon notwithstanding the fact that the recording head structure was completely homogeneous without grooves in the bottom of the head structure to isolate adjacent heads.

What I claim as new and desire to secure by Letters Patent of the United States is:

1. A method of forming a read/write head for magnetic recording comprising the steps of:

juxtaposing a magnetic material on opposite sides of an electrical conductive wire, compressing said juxtaposed magnetic material and said wire to reduce the thickness of said wire to a predetermined head gap width, and dissecting said compressed structure along a plane perpendicular to the plane of said compressed wire to expose the recording surface of said head.

2. A method of forming a read/write head for magnetic recording according to claim 1 wherein said juxtaposed structure is a wire sheathed within a magnetic material and at least a linear portion of said sheathed wire conductor is compressed to an oval cross-sectional configuration during the forming of said head.

3. A method of forming a read/write head according to claim 2 wherein a central section of said magnetic sheathed wire is compressed and further including applying electrical signals to the extremities of said central compressed sheathed wire to write information upon a magnetic film positioned in a confronting attitude relative to the recording surface of said head.

4. A method of forming a read/write head according to claim 3 further including mechanically bonding said compressed section of said sheathed wire to a dielectric substrate characterized by a high thermal conductivity.

5. A method of forming a read/write head for magnetic recording according to claim 1 including joining a plurality of leads to said compressed structure at spaced apart locations along the axial length of said structure, the area of said compressed structure between adjacent said leads forming individual recording heads.

6. A method of forming a read/write head according to claim 5 wherein alternate of said leads are joined to opposite faces of said compressed structure, said leads extending over at least one-half the height of said head.

7. A method of forming a read/write head for magnetic recording comprising; juxtaposing a magnetic material on opposite sides of an electrical conductor by filling a magnetic tube with an electrical conductor, compressing said juxtaposed magnetic material and said electrical conductor by cold-rolling the structure to a conductor thickness less than 0.5 mil to reduce the thickness of said conductor to a predetermined head gap width, and dissecting said compressed structure along a plane perpendicular to the plane of said compressed conductor to expose the recording surface of said head.

References Cited

UNITED STATES PATENTS

| | | | |
|---|---|---|---|
| 3,004,325 | 10/1961 | Kornei | 29—603 |
| 3,187,411 | 6/1965 | Duinker et al. | 29—603 |
| 3,246,384 | 4/1966 | Vice | 29—603 |

JOHN F. CAMPBELL, Primary Examiner

C. E. HALL, Assistant Examiner

U.S. Cl. X.R.

179—100.26